(12) United States Patent
Otsuka

(10) Patent No.: US 8,081,891 B2
(45) Date of Patent: Dec. 20, 2011

(54) IMAGE QUALITY ADJUSTMENT METHOD, IMAGE FORMING APPARATUS AND COMPUTER READABLE MEDIUM

(75) Inventor: Masayuki Otsuka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 147 days.

(21) Appl. No.: 12/459,104

(22) Filed: Jun. 26, 2009

(65) Prior Publication Data
US 2010/0003041 A1    Jan. 7, 2010

(30) Foreign Application Priority Data
Jul. 2, 2008 (JP) ................................. 2008-173710

(51) Int. Cl.
G03G 15/00    (2006.01)
(52) U.S. Cl. ............................................. 399/49; 399/72
(58) Field of Classification Search ............ 399/49, 399/43, 51, 50, 72, 302, 308
See application file for complete search history.

(56) References Cited

U.S. PATENT DOCUMENTS

| 5,839,018 A | 11/1998 | Asanuma et al. |
| 2007/0286622 A1* | 12/2007 | Morikuni ........................ 399/49 |
| 2008/0218778 A1* | 9/2008 | Kusunoki |

FOREIGN PATENT DOCUMENTS

| JP | 8-272202 | 10/1996 |
| JP | 2001-309178 | 11/2001 |
| JP | 2003-035977 | 2/2003 |
| JP | 2003-91224 | 3/2003 |
| JP | 2006119504 | 5/2006 |
| JP | 2006-220959 | 8/2006 |
| JP | 2008-134461 | 6/2008 |

* cited by examiner

Primary Examiner — David Porta
Assistant Examiner — Milton Gonzalez
(74) Attorney, Agent, or Firm — Edwards Wildman Palmer LLP; David G. Conlin; David A. Tucker

(57) ABSTRACT

When an image forming job is completed that records onto a recording sheet an image formed on a photoconductor drum and conveys the recording sheet, a simple process control is carried out that forms some filled patch images with using some toners. After the simple process control is carried out, a determination is carried out, in accordance with a charge control value of a charge roller adjusted by the simple process control (a voltage value applied on the charge roller), whether a formal process control should be carried out or not that forms many patch images with using much toners. The formal process control is additionally carried out, when the determination means so.

14 Claims, 6 Drawing Sheets

F I G. 4
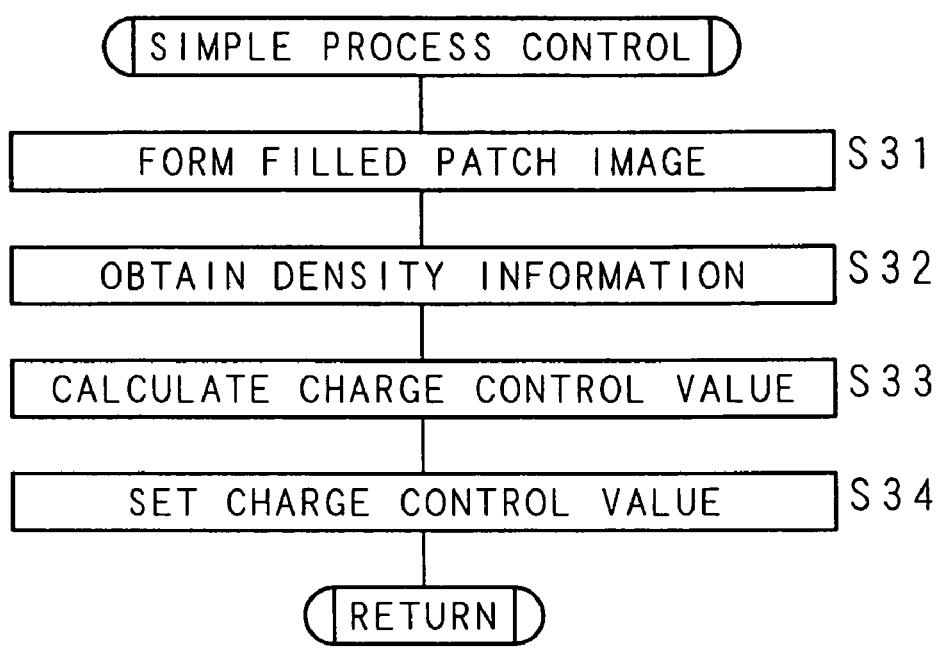

F I G. 5

| ACCUMULATIVE NUMBER OF RECORDED PAPER (THOUSAND FOLD) | PREDETERMINED VALUE |
|---|---|
| ~10 | 40 |
| ~20 | 25 |
| ~30 | 20 |
| 30.001~ | 15 |

IMAGE QUALITY ADJUSTMENT METHOD, IMAGE FORMING APPARATUS AND COMPUTER READABLE MEDIUM

CROSS-REFERENCE TO RELATED APPLICATIONS

This Nonprovisional application claims priority under 35 U.S.C. §119(a) on Patent Application No. 2008-173710 filed in Japan on Jul. 2, 2008, the entire contents of which are hereby incorporated by reference.

BACKGROUND OF THE INVENTION

1. Field of the Invention

The present invention relates to an image quality adjustment method, image forming apparatus and a computer readable medium for adjusting quality of image that is to be recorded on a recording sheet.

2. Description of Related Art

An image forming apparatus with an electrographic manner, such as a copying machine, printer and a facsimile, performs an image recording job: such as to expose a photoconductor drum; form an electrostatic latent image by the exposure; develop the formed electrostatic latent image with toners to form a toner image; record the formed toner image on a recording sheet and to export the recording sheet.

The image forming apparatus includes a development apparatus that is roughly classified into two types: a development apparatus with monocomponent development method that utilizes single component toners; and a development apparatus with two component development method that utilizes two component developers including non-magnetic toners and magnetic carriers. Although the monocomponent development manner is suitable for downsizing the image forming apparatus, it is not suitable for implementing fast development and has a problem such as a limited toner life. Thus, the two component development method is generally utilized for the image forming apparatus.

When a development apparatus with the two component development method carries out a development process, non-magnetic toners are consumed while magnetic carriers are not consumed. Thus, an amount of the non-magnetic toners is reduced inside the development apparatus, while the magnetic carriers remain inside the development apparatus. A reduction of a toner amount causes deteriorating image quality. For keeping image quality of the development apparatus with the two component development manner, non-magnetic toners should be additionally supplied at proper timing, to keep a constant toner density of the two component developers Furthermore, image quality of image forming apparatus is affected by deterioration of a photoconductor drum and two component developers, changing environmental conditions such as temperature and moisture, and the like. Thus, a general image forming apparatus automatically adjust image quality again, when a number of recording sheets having recorded image becomes no less than a predetermined number after image quality has been adjusted once, for keeping constant image quality.

However, an image recording job is not carried out during adjusting image quality. Thus, a user may happen to wait until the image quality adjustment is completed. Therefore, it is important to recognize a proper start timing of an image quality adjustment, for keeping up both convenience for a user and stability of image quality.

Recently, several image quality adjustment techniques are disclosed (process control technique), and process controls are carried out in accordance with detailed image forming conditions.

For example, an image forming apparatus is disclosed to adjust a timing of a process control, in accordance with a formed image ratio of monochrome image and color image (Japanese Patent Application Laid-Open No. 2003-91224). A monochrome image generally does not require higher image quality than a color image. Thus, in the case of a higher monochrome image ratio, the image forming apparatus shown in Japanese Patent Application Laid-Open No. 2003-91224 does not carry out a process control even when the number of recording sheets each having a recorded image becomes no less than a predetermined number. Then, this allows shortening a period of time when an image recording job cannot be carried out, because a wasteful process control is not carried out. Thus, it is possible to keep up both convenience for a user and stability of image quality.

Furthermore, an image forming apparatus is disclosed which carries out a process control when a predetermined period of time has passed since an image recording job is completed (Japanese Patent Application Laid-Open No. 2006-220959). For example, a user generally does not use the image forming apparatus at lunch break or after office hours, and it is assumed to have much time from a completion of an image recording job to a start of the next image recording job during such time periods. Thus, a process control is carried out during these time periods, for keeping up both convenience for a user and stability of image quality.

SUMMARY OF THE INVENTION

The image forming apparatuses, as described above, carry out process controls, and then adjust image quality adjustment values for adjusting image quality. As for the image quality adjustment values, a voltage value and an output value (or output duty value) are utilized: the voltage value (referred to as a charge control value) being applied to a charger that charges a photoconductor drum; and the output value (referred to as a exposure control value) being exposed to the photoconductor drum by an exposure light source.

For adjusting the charge control value, it is firstly required to form some patch images (referred to as filled patch images), each of which consists of one color of toners filled on a part of the photoconductor drum, by applying voltage having several types of charge control values, instead of exposing the photoconductor drum. Secondly, it is required to detect optical reflection densities for all the filled patch images. The charge control value is then calculated to obtain predetermined optical reflection densities, in accordance with the detected results.

On the other hand, for adjusting a gamma characteristic of halftone, it is firstly required to form dozens of patch images (referred to as halftone patch images), each of which consists of intermediate colors (halftones) applied on the photoconductor drum, by exposing the photoconductor drum while changing the exposure control value. Secondly, it is required to detect optical reflection densities for the halftone patch images. The exposure control value is then calculated to obtain a predetermined gamma characteristic value, in accordance with the detected results.

As described above, the process control requires forming many patch images on the photoconductor drum. Thus, the process control consumes a large amount of toners and takes long time until its completion.

The image forming apparatus shown in Japanese Patent Application Laid-Open No. 2003-91224 may carry out a process control that takes time, even during carrying out an image recording job, when both conditions about the number of recording sheets and about the formed image ratio are satisfied. In this case, a user has to wait until the process control is completed.

On the other hand, the image forming apparatus shown in Japanese Patent Application Laid-Open No. 2006-220959 takes time for carrying out a process control itself, although this apparatus does not carry out the process control during carrying out an image recording job.

Furthermore, in the image forming apparatus shown in Japanese Patent Application Laid-Open No. 2003-91224, as well as the image forming apparatus shown in Japanese Patent Application Laid-Open No. 2006-220959, the process control consumes a large amount of toners to form patch images on the photoconductor drum. Thus, these apparatuses have an inclination to get low toners for recording an image on a recording sheet. Furthermore, in these apparatuses, the photoconductor drum and the two component developer may deteriorate through forming images. Therefore, these apparatuses may contrarily deteriorate image quality.

Although it is thought to reduce frequency of the process control in order to decrease toner consumption required for the process control, this reduction cannot keep up stability of image quality.

The present invention is made in view of such circumstances, and has a primary object to provide an image quality adjustment method, image forming apparatus and a computer readable medium, which adjust an image quality adjustment value with using an image quality adjustment that forms predetermined numbers of patch images with predetermined amounts of image forming materials; determine in accordance with the adjusted image quality adjustment value whether another image adjustment should be carried out or not, another image adjustment utilizing larger amounts of image forming materials than the predetermined amounts and forming larger numbers of patch images than the predetermined numbers; and carry out this another image adjustment only when having determined that this another image adjustment should be carried out, for keeping up both convenience for a user and stability of image quality; decreasing consumption of image forming materials required for the image quality adjustments; and for shortening the required time for the image quality adjustments.

The image forming apparatus according to the present invention adjusts quality of image recorded on a recording sheet. While the image forming apparatus according to the present invention may include a general image forming unit, general transfer unit, general conveyor unit and a general density detecting unit that are similar as a general image forming apparatus, the image forming apparatus according to the present invention performs in accordance with a computer program, for example, based on the image quality adjustment method according to the present invention.

The image forming apparatus has completion determination means for performing a completion determination step to determine whether a recording sheet is conveyed by a conveyor unit or not. In other words, at the completion determination step, the image forming apparatus determines whether an image forming job is completed or not, the image forming job including series of processes, such that an image is formed on an image carrier with using image forming materials, for example, in accordance with a user's instruction; the formed image is transferred onto one or plural recording sheets; and the one or plural recording sheets with transferred image are conveyed.

Furthermore, the image forming apparatus according to the present invention has sheet number count means that count the number of recording sheets transferred by the transfer unit after an image quality adjustment process is carried out (a part of a sheet number determination step), and has sheet number determination means that determines whether the number counted by the sheet number count means is no less than a predetermined number or not (another part of the number determination step). At the sheet number determination step, it is determined whether image quality of the apparatus is estimated to become unstable because of image recording jobs carried out several times.

When the completion determination means determines that an image forming job is completed and the sheet number determination means determines that the number counted by the sheet number count means is no less than a predetermined number, a first image quality adjustment step is carried out. In other words, when an image forming job is completed and image quality of the apparatus is estimated to become unstable, the first image quality adjustment step is carried out.

At the first image quality adjustment step, an image quality adjustment value is adjusted that is utilized for adjusting quality of image recorded on a recording sheet. Thus, the image forming apparatus according to the present invention has first forming control means that control an image carrier to form predetermined numbers of patch images on an image forming unit with using predetermined amounts of image forming materials. Further, the image forming apparatus according to the present invention has first density obtaining means that obtains, from a density detecting unit, density information of the patch images which are formed through controlling the image forming unit by the first forming control means. Furthermore, the image forming apparatus according to the present invention has first calculating means that calculates an image quality adjustment value that is utilized for adjusting quality of image recorded on a recording sheet, in accordance with the density information obtained by the first density obtaining means. Moreover, the image forming apparatus according to the present invention has first setting means that sets, onto the image forming unit, the image quality adjustment value calculated by the first calculating means, for making the image forming unit form an image with using the calculated image quality adjustment value.

On the other hand, the image forming apparatus according to the present invention performs a second image quality adjustment step that is for adjusting an image quality adjustment value which is the same as or different from the image quality adjustment value adjusted at the first quality adjustment step. Thus, the image forming apparatus according to the present invention has second forming control means that utilize larger amounts of image forming materials than the predetermined amounts and form larger numbers of patch images than the predetermined numbers onto the image carrier. Further, the image forming apparatus according to the present invention has second density obtaining means that obtains, from a density detecting unit, density information of the patch images which are formed through controlling the image forming unit by the second forming control means. Furthermore, the image forming apparatus according to the present invention has second calculating means that calculates the image quality adjustment value that is utilized for adjusting quality of image recorded on a recording sheet, in accordance with the density information obtained by the second density obtaining means. Moreover, the image forming apparatus according to the present invention has second setting means that sets, onto the image forming unit, the image quality adjustment value calculated by the second calculating means, for making the image forming unit form an image with using the calculated image quality adjustment value.

At the second image quality adjustment step, the image forming apparatus according to the present invention performs a formal image quality adjustment, such as a conventional image quality adjustment performed by the general image forming apparatus. The formal image quality adjustment requires consuming large amount of toners and takes long time until its completion because of forming large numbers of patch images.

On the other hand, at the first image quality adjustment step, the image forming apparatus according to the present invention performs a simpler image quality adjustment (referred to as a simple image quality adjustment) than the formal image quality adjustment, such as a conventional image quality adjustment performed by the general image forming apparatus. The first image quality adjustment step neither requires consuming large amount of toners nor takes long time until its completion because of forming some patch images The simple image quality adjustment is carried out when the number of sheets with recorded images is no less than a predetermined number after an image recording job is completed, while it is not carried out during performing an image recording job.

When image quality is kept stable by the simple image quality adjustment, the formal image quality adjustment is not required to be carried out. However, it is difficult to keep the stable image quality continuously only by the simple image quality adjustment. Therefore, the simple image quality adjustment is carried out normally that consumes small amounts of image forming materials and takes short time until its completion, while the formal image quality adjustment is carried out occasionally that consumes large amounts of image forming materials and takes long time until its completion Thus, the image forming apparatus according to the present invention has practice determination means that carry into practice a practice determination step for determining, in accordance with the image quality adjustment value calculated by the first calculating means (i.e., the image quality adjustment value adjusted at the first image quality adjustment step), whether an additional image quality adjustment should be carried out or not.

The second image quality adjustment step is carried out when the practice determination means determine that an additional image quality adjustment should be carried out. In other words, the formal image quality adjustment is not always carried out when the number of sheets with recorded images is no less than a predetermined number. The formal image quality adjustment is carried out when image quality is not kept stable only by the simple image quality adjustment.

The image forming apparatus according to the present invention has accumulation means that accumulates absolute values of differences between the image quality adjustment values each calculated for carrying out a formal image quality adjustment and the image quality adjustment values each calculated for carrying out a simple image quality adjustment after carrying out the formal image quality adjustment.

The practice determination means of the image forming apparatus determines that the formal image quality adjustment should be carried out when the accumulated value is no less than a predetermined value. The case that the accumulated value is no less than a predetermined value means a case that image quality is not kept stable only by the simple image quality adjustment.

If the image forming apparatus is configured to carry out the formal image quality adjustment in the case that an absolute value of a difference between the image quality adjustment value calculated for carrying out the formal image quality adjustment and the image quality adjustment value calculated for carrying out the simple image quality adjustment is no less than a predetermined value, only the simple image quality adjustment may be repeated in the case that the absolute value of a difference between the image quality adjustment values for the formal and simple quality adjustments. Therefore, image quality may be deteriorated because the formal image quality adjustment is rarely carried out.

On the other hand, when the accumulated value of the absolute values of the differences is compared to a predetermined value, the accumulated value become gradually larger even in the case that each absolute value of a difference between the image quality adjustment value calculated for carrying out the formal image quality adjustment and the image quality adjustment value calculated for carrying out the simple image quality adjustment is less than a predetermined value. Thus, the formal image quality adjustment is eventually carried out after repeating the simple image quality adjustment. Therefore, it is possible to carry out the formal image quality adjustment with a proper frequency.

In the present invention, the first forming control means makes the image carrier form predetermined numbers of filled patch images with using predetermined amounts of image forming materials onto the image carrier, when the simple image quality adjustment is carried out. Then, the first density obtaining means obtains density information of the filled patch images formed by the first forming control means onto the image forming unit. Further, the first calculating means calculates the image quality adjustment value for adjusting quality of image recorded on a recording sheet, in accordance with the density information obtained by the first density obtaining means. Furthermore, the first setting means sets the image quality adjustment value calculated by the first calculating means onto the image forming unit, for making the image forming unit form an image with using the calculated image quality adjustment value.

On the other hand, the second forming control means makes the image carrier form predetermined numbers of filled patch images with using predetermined amounts of image forming materials and onto the image carrier, when the formal image quality adjustment is carried out. Furthermore, the second forming control means makes the image forming unit form patch images different from the filled patch images. In other words, the second forming control means utilizes larger amounts of image forming materials than the predetermined amounts and form larger numbers of patch images than the predetermined numbers onto the image carrier.

Then, the second density obtaining means obtains, from the density detecting unit, each density information of the filled patch images formed onto the image forming unit by the second forming control means and each density information of the patch images different from the filled patch images.

Furthermore, the second calculating means calculates a first image quality adjustment value for adjusting quality of image recorded on a recording sheet, in accordance with the density information of the filled patch images obtained by the second density obtaining means. This first image quality adjustment value is the same as the image quality adjustment value that is adjusted when the simple image quality adjustment is carried out. The second calculating means moreover calculates a second image quality adjustment value for adjusting quality of image recorded on a recording sheet, in accordance with the density information of the patch images different from the filled patch images obtained by the second density obtaining means. This second image quality adjustment value is generally classified into a type different from that of the first image quality adjustment value.

Finally, the second setting means sets the first and the second image quality adjustment values onto the image forming unit, for making the image forming unit form an image with using the first and the second image quality adjustment values calculated by the second calculating means.

In other words, an image quality adjustment value related to a filled patch image is adjusted not only for the formal image quality adjustment but also for simple image quality adjustment. Forming a filled patch image with a predetermined density is one of the main factors to keep stable image quality. Thus, it is possible to keep stable image quality by the simple image quality adjustment.

Furthermore, an adjustment of an image quality adjustment value in accordance with density information of filled patch images can reduce the number of the patch images required to be formed, for example, in comparison with adjustment of an image quality adjustment value in accordance with density information of patch images consisting of intermediate colors (i.e. half tone patch images). Thus, these configurations lead advantages contributing to saving image forming materials.

On the other hand, when the formal image quality adjustment is carried out, several patch images are formed that include filled patch images and patch images other than the filled patch images (e.g. halftone patch images). Thus, it is possible to keep stable image quality more efficiently, because an image quality adjustment is carried out in accordance with density information of the formed several patch images.

Furthermore, it is possible to uniform a partial procedure of the formal image quality adjustment and a partial procedure of the simple image quality adjustment. Thus, a procedure of the total image quality adjustment becomes simpler than an image quality adjustment requiring a simple image quality adjustment that is configured with a procedure completely different from the formal image quality adjustment. Therefore, it is possible to save image forming materials and to shorten required time until completion, by omitting a process of the formal image quality adjustment similar to a process of the simple image quality adjustment, for example, when the formal image quality adjustment is carried out just after the simple image quality adjustment is completed.

In the present invention, an image is formed on the image carrier that is charged by the charge unit. Thus, a voltage value applied on the charge unit (i.e., the charge control value) directly depends on a density of an image formed on the image carrier. Therefore, it is possible to simplify an image quality adjustment, by utilizing the charge control values as the image quality adjustment values calculated for the formal and the simple image quality adjustments and by calculating a charge control value in accordance with the density of a patch image formed on the image carrier.

Furthermore, it is possible to simply determine whether the formal image quality adjustment should be carried out or not, by comparing the charge control values utilized for the formal and the simple image quality adjustment, in the case that the determination depends on the comparison between the image quality value calculated for the formal image quality adjustment and the image quality value calculated for the simple image quality adjustment.

In the present invention, the determination is based on the image quality adjustment value calculated for the simple quality adjustment; whether the formal image quality adjustment should be carried out or not. A condition of the determination is changed in accordance with an accumulated number of recording sheets on which images are recorded after an image quality adjustment is carried out.

A large accumulated number means that a repetitive use causes deteriorating the image carrier, image forming materials and the like. Thus, a larger accumulated number tends to cause deteriorating image quality much more.

Therefore, even when the accumulated number becomes larger, it is possible to keep stable image quality by changing the determination condition to shorten an interval of image quality adjustments in the case with large accumulated number. On the other hand, when the accumulated number becomes smaller, it is possible to keep up convenience for a user by changing the determination condition to widen an interval of image quality adjustments in the case with small accumulated number.

A counting the accumulated number of recording sheet is started at a proper timing (for example, when the power is turned on after shipping from the factory).

In the present invention, it is accumulated the absolute values of differences between the image quality adjustment values each calculated for carrying out a formal image quality adjustment and the image quality adjustment values each calculated for carrying out a simple image quality adjustment after carrying out the formal image quality adjustment, and is determined to carry out the formal image quality adjustment when the accumulated value is no less than a predetermined value. The predetermined value is reduced in accordance with an increase of the accumulated number of recording sheets on which images are recorded after an image quality adjustment is carried out.

A large accumulated number of recording sheets means that a repetitive use causes deteriorating the image carrier, image forming materials and the like. Thus, a larger accumulated number of recording sheets tends to cause deteriorating image quality much more.

Therefore, it is possible to shorten an interval of image quality adjustments by reducing the predetermined value, in the case with larger accumulated number of recording sheets, and it is possible to keep a stable image quality even when the accumulated number of recording sheets becomes larger. On the other hand, when the accumulated number of recording sheets is smaller, the predetermined value is larger. Thus, it is possible to widen an interval of image quality adjustments and to keep up convenience for a user.

A counting the accumulated number of recording sheet is started at a proper timing (for example, when the power is turned on after shipping from the factory).

In the present invention, each means of the image forming apparatus according to the present invention may be implemented in software with using hardware elements of computer, and the image forming apparatus according to the present invention may serve as an apparatus utilized for the image quality adjustment method according to the present invention.

In the image quality adjustment method and the image forming apparatus according to the present invention, the simple image quality adjustment is carried out when an image recoding job is completed. Thus, an image quality adjustment is not carried out with interruption of the image recording job during performing the image recording job. Therefore, it is possible to prevent the case that an image quality adjustment is carried out during performing the image recording job and a user happens to wait until the image quality adjustment is completed.

Furthermore, the simple image quality adjustment needs short required time. Therefore, even if a user desires to carry out an image recording job during carrying out the simple image quality adjustment, the user does not need waiting for long time until the simple image quality adjustment is completed.

Moreover, it is possible to carry out the formal image quality adjustment in the case that the simple image quality adjustment is not enough for keeping a stable image quality. Therefore, it is possible to constantly keep a stable image quality.

In other words, it is possible to prevent a shortage of image forming materials for recording an image on a recording sheet and to prevent deteriorating the photoconductor drum and image forming materials, by carrying out at required timing the formal image quality adjustment that requires large amounts of image forming materials less often than the simple image quality adjustment that requires small amounts of image forming materials. Furthermore, these configurations do not require reducing a frequency of image quality adjustment for saving the consumption of the image forming materials.

Therefore, the present invention leads advantages keeping up both convenience for a user and stability of image quality; decreasing consumption of image forming materials required for the image quality adjustments; and shortening the required time for the image quality adjustments.

In the computer readable medium according to the present invention, for example, it is possible to allow a conventional image forming apparatus to work as the image forming apparatus utilized for the image quality adjustment method according to the present invention (i.e., the image forming apparatus according to the present invention). Therefore, it is possible to make an image forming apparatus having already shipped from the factory work as the image forming apparatus according to the present invention, instead of manufacturing the image forming apparatus according to the present invention in the factory and shipping the manufactured apparatus from the factory.

The above and further objects and features of the invention will more fully be apparent from the following detailed description with accompanying drawings.

BRIEF DESCRIPTION OF THE DRAWINGS

FIG. 4 is a flowchart showing a subroutine of a simple process control procedure performed by the image forming apparatus in accordance with the embodiment of the present invention.

FIG. 5 is a schematic view showing an example of predetermined value table stored in a storage of the image forming apparatus in accordance with the embodiment of the present invention.

DESCRIPTION OF THE PREFERRED EMBODIMENTS

In the following, the present invention will be explained on the basis of drawings showing an embodiment thereof.

Figure 1:
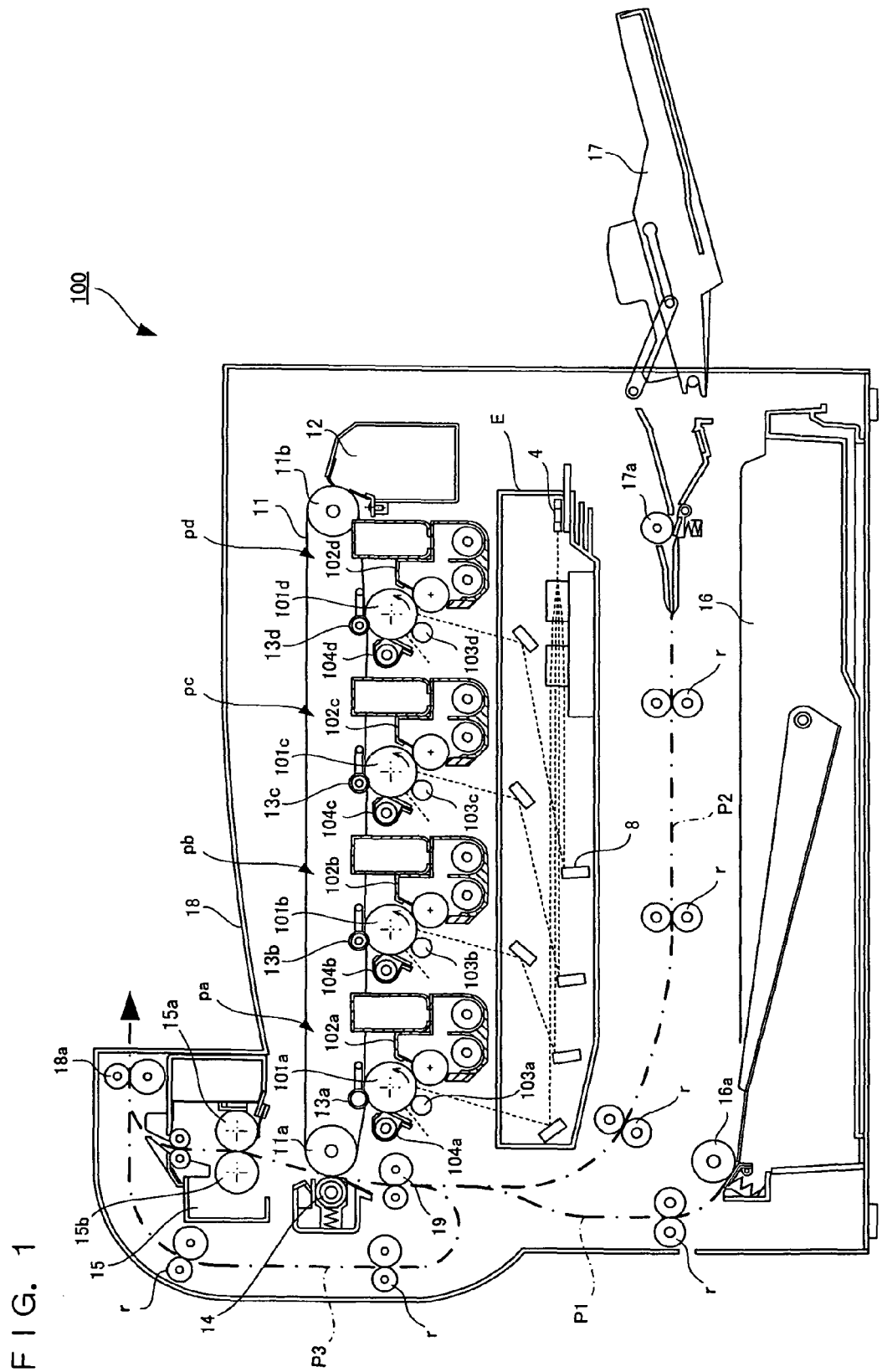
FIG. 1 is an elevation view schematically showing an inner structure of an image forming apparatus in accordance with an embodiment of the present invention.

FIG. 1 is an elevation view schematically showing an inner structure of an image forming apparatus 100 in accordance with an embodiment of the present invention.

The image forming apparatus 100 records an image with multicolor or monochrome on a paper (recording sheet) in accordance with image data obtained by reading an image of document, or by receiving through a LAN, communication table, and the like. Thus, the image forming apparatus 100 includes an exposure unit E, image forming units pa, pb, pc, pd, intermediate transfer belt 11, second transfer roller 14, fixing device 15, sheet conveyance ways P1, P2, P3, sheet feed cassette 16, manual sheet feed tray 17, sheet ejection tray 18 and the like.

The image forming units pa, pb, pc, pd form images with using image data corresponding to four colors respectively. The four color is configured with black (K), and three subtractive primary colors obtained by a color separation of color image: cyan (C), magenta (M) and yellow (Y). In the following, "a" is given to an element for black, "b" is given to an element for cyan, "c" is given to an element for magenta, and "d" is given to an element for yellow, about elements 101, 102, 103, 104, 13 and 23 (FIG. 2), similarly to the elements pa, pb, pc and pd.

The image forming units pa-pd have almost the same configuration with each other, and include photoconductor drums 101a-101d, development device 102a-102d, charge rollers 103a-103d, cleaning units 104a-104d, first transfer rollers 13a-13d, and the like.

The intermediate transfer belt 11 consists of a film with a width of about 100-150 μm. The intermediate transfer belt 11 is a loop shaped travel pathway suspended from a drive roller 11a to a follower roller 11b above the photoconductor drums 101a-101d.

The image forming units pa-pd are aligned in a line along a rotational movement direction of the intermediate transfer belt 11 (sub-scanning direction). Thus, an outer undersurface of the intermediate transfer belt 11 sequentially faces to the photoconductor drum 101d, photoconductor drum 101c, photoconductor drum 101b and the photoconductor drum 101a, in this order. The first transfer rollers 13a-13d are arranged to face the photoconductor drums 101a-101d, respectively, with the intermediate transfer belt 11 arranged therebetween. In the following, a first transfer position is referred to as each of the positions where the intermediate transfer belt 11 faces to the photoconductor drums 101a-101d.

The charge rollers 103a-103d are contact type chargers that uniformly charge the surfaces of photoconductor drums 101a-101d with a predetermined voltage, respectively. Instead of the charge rollers 103a-103d, the image forming apparatus 100 may include contact type chargers having charge brushes or noncontact type chargers having charge wires.

The exposure unit E includes a semiconductor laser irradiation device (not shown), polygon mirror 4, first reflection mirror, second reflection mirror 8 and the like, to respectively irradiate toward the photoconductor drums 101a-101d laser beams modulated with image data corresponding to four colors: black, cyan, magenta and yellow. Thus, electrostatic latent images are respectively formed in accordance with image data corresponding to the four colors, onto photoconductor drums 101a-101d.

The development devices 102a-102d respectively contain two component developers including toners, which serve as image forming materials, supply the toners to the surfaces of the photoconductor drums 101a-101d having electrostatic latent images, and form toner images by developing the electrostatic latent images. The development devices 102a-102d respectively contain toners corresponding to the four colors, and respectively form toner images corresponding to the four colors.

The first transfer rollers 13a-13d are respectively applied first transfer biases that have reverse polarity to the charge polarity of the toners, by constant voltage controls, for transferring onto the intermediate transfer belt 11 toner images carried on the surfaces of the photoconductor drums 101a-101d. Thus, each of the toner images formed on the photoconductor drums 101a-101d with correspondences to the four colors is sequentially transferred on the outer surface of the intermediate transfer belt 11 to be overlaid each other, and then a full color toner image is formed on the outer surface of the intermediate transfer belt 11.

For these configurations, each of the first transfer rollers 13a-13d is configured with a metal (e.g., stainless steel) stem (diameter: about 8-10 mm) covered with a conductive elastic material (e.g., EPDM rubber or urethane foam rubber). Because of the conductive elastic materials, each of the first transfer rollers 13a-13d can apply high voltage uniformly on the intermediate transfer belt 11.

If inputted image data correspond to one of the four colors, the image forming apparatus 100 forms an electrostatic latent image and a toner image only on the photoconductor drum corresponding to the color for the inputted image data, among the four photoconductor drums 101a-101d. For example, when forming a monochrome image, the image forming apparatus 100 forms an electrostatic latent image and a toner image only on the photoconductor drum 101a that corresponds to black, and then transfers only a black toner image on the outer surface of the intermediate transfer belt 11.

The cleaning units 104a-104d respectively remove and collect residual toners on the surface of the photoconductor drums 101a-101d after developing and transferring.

After being respectively transferred on the outer surface of the intermediate transfer belt 11 at the first transfer positions of the photoconductor drums 101a-101d, the toner images are moved to a position facing to the second transfer roller 14 (referred to as a second transfer position), by the rotational movement of the intermediate transfer belt 11. The second transfer roller 14 contacts a site of the outer surface of the intermediate transfer belt 11 with a predetermined nip pressure, while the drive roller 11a contacts a site of the inner surface of the intermediate transfer belt 11 opposing the site of the outer surface during-forming an image. A paper supplied by the sheet feed cassette 16 or the manual sheet feed tray 17 passes a position between the second transfer roller 14 and the intermediate transfer belt 11 (i.e. the second transfer position). At the time, high voltage is applied to the second transfer roller 14 with reverse polarity to charge polarity of the toners. Thus, a toner image is transferred onto a paper surface from the outer surface of the intermediate transfer belt 11.

Some toners remain on the intermediate transfer belt 11 even after toner movement from the photoconductor drum 101a-101d onto the intermediate transfer belt 11 and transferring the moved toners onto a paper. The remained toners (residual toners) are collected by the cleaning unit 12 for preventing color mixing at the next step.

A paper having a transferred toner image is conveyed toward the fixing device 15 and passes through between a heat roller 15a and a pressure roller 15b, to be heated and to be applied pressure. Thus, the transferred toner image is fixed firmly on the paper. The paper having the fixed toner image is ejected onto the sheet ejection tray 18 by an ejection roller 18a.

As described above, at least one image formed on the photoconductor drum 101a, 101b, 101c or 101d with using each color toners is transferred onto a paper that is ejected onto the sheet ejection tray 18 (image recording job).

The image forming apparatus 100 includes sheet conveyance way P1 that is arranged in an almost vertical direction to convey a paper contained in the sheet feed cassette 16 to the sheet ejection tray 18 through the second transfer position and the fixing device 15. In the sheet conveyance way P1, there are a pickup roller 16a that singly picks up a paper contained in the sheet feed cassette 16 to bring into the sheet conveyance way P1, a conveyance roller r that conveys the brought paper upward, a resist roller 19 that moves the conveyed paper to the second transfer position at a predetermined timing, and an ejection roller 18a that ejects the paper onto the sheet ejection tray 18.

Furthermore, the image forming apparatus 100 includes, between the manual sheet feed tray 17 and the resist roller 19, a sheet conveyance way P2 that arranges a pickup roller 17a which singly brings a paper placed on the manual sheet feed tray 17, and conveyance rollers r, r, r which convey the brought paper upward. Moreover, the image forming apparatus 100 includes, between the ejection roller 18a and the resist roller 19 of the sheet conveyance way P1, a sheet conveyance way P3 that arranges conveyance rollers r, r.

The ejection roller 18a is arranged in a rotatable manner forwardly and reversely. The ejection roller 18a rotates forwardly to eject a paper onto the sheet ejection tray 18, in a case of forming an image on one side of the paper or in a case of forming a second side image for forming images on both side of the paper. On the other hand, in a case of forming a first side image for forming images on both side of the paper, the ejection roller 18a is driven to rotate forwardly until the rear edge of the paper passes through the fixing device 15, and then is driven to rotate reversely with supporting the rear edge of the paper. Thus, the paper is moved to the sheet conveyance way P3. Therefore, after being formed an image on one side, the paper is reversed upside down and front-side back, and then moved to the sheet conveyance way P1.

The resist roller 19 moves, to the second transfer position at the timing synchronizing with the rotational movement of the intermediate transfer belt 11, a paper supplied from the sheet feed cassette 16 or the manual sheet feed tray 17, or a paper conveyed through the sheet conveyance way P3. Thus, the resist roller 19 stops the rotation movement when the photoconductor drums 101a-101d and the intermediate transfer belt 11 begin to work. Before the intermediate transfer belt 11 begins to rotate, a supplied or a conveyed paper is stopped in the sheet conveyance way P1 with the front edge contacting the resist roller 19. Then, the resist roller 19 begins to rotate, at the position where a second transfer roller 14 and the intermediate transfer belt 11 press together, at the timing when the front edge of the paper faces to a front edge of toner image formed on the intermediate transfer belt 11.

In a case of forming a full color image with all image forming units pa-pd forming images, the first transfer rollers 13a-13d make the intermediate transfer belt 11 and all the photoconductor drums 101a-101d press together. On the other hand, in a case of forming a monochrome image with only image forming unit pa forming an image, only the first transfer roller 13a makes the intermediate transfer belt 11 and the photoconductor drum 101a press together.

Figure 2:
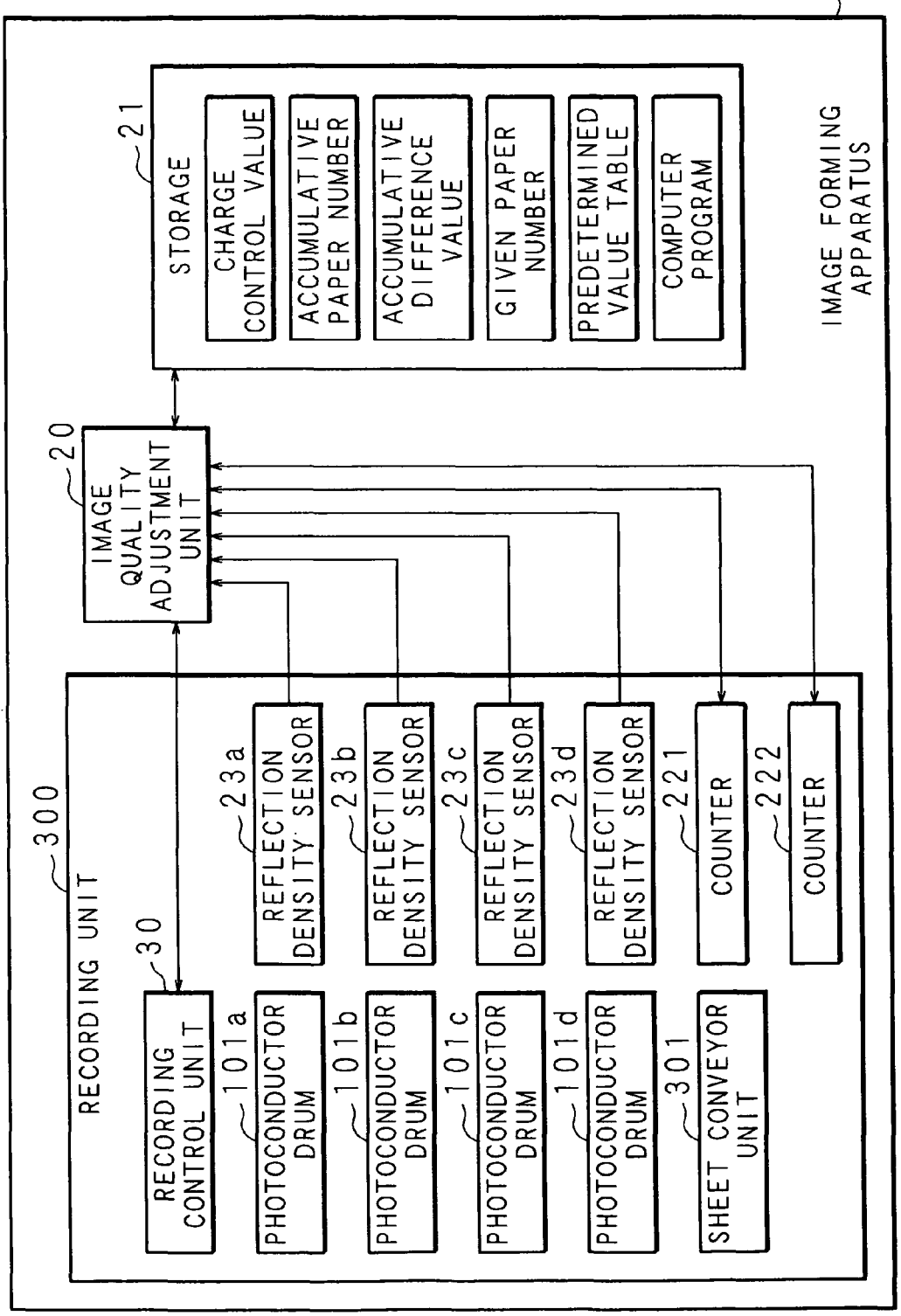
FIG. 2 is a block diagram showing main parts of the image forming apparatus in accordance with the embodiment of the present invention.

FIG. 2 is a block diagram showing main parts of the image forming apparatus 100 in accordance with the embodiment of the present invention. A numeral 300 in FIG. 2 is a recording unit that includes the sections shown in FIG. 1, a recording control unit 30, counters 221, 222, and reflection density sensors 23a-23d. The operation of the recording unit 300 is controlled by the recording control unit 30. A numeral 301 is a sheet conveyor unit that includes the sections consisting of the sheet conveyance ways P1, P2 P3 shown in FIG. 1 (e.g. conveyance roller r, ejection roller 18a and the like).

The image forming apparatus 100 further includes: an image quality adjustment unit 20 consisting of a processor; and a storage 21.

The storage 21 is controlled to store a charge control value, accumulative paper number and an accumulative difference value (described later), by the image quality adjustment unit 20. Furthermore, the storage 21 stores a given paper number, predetermined value table and a computer program (described later), in advance. It should be noted that the storage 21 may consist of an EEPROM, ROM or RAM.

The image quality adjustment unit 20 works in accordance with the computer program stored in the storage 21. This computer program is based on the image quality adjustment method according to the present invention (in other words, this is a computer program according to the present invention).

Thus, it is possible to easily implement the image forming apparatus 100, for example, with a conventional image forming apparatus additionally supplied the storage 21 installing the computer program according to the present invention, or a control board including such the image quality adjustment unit 20, or with a conventional image forming apparatus exchanged its conventional control board with the control board including such the image quality adjustment unit 20. Therefore, even when a user already has an image forming apparatus, it is easy to make the user's image forming apparatus serve as the image forming apparatus 100.

When a user handles a start button (not shown), the recording control unit 30 controls each section of the recording unit 300 to carry out an image recording job. For example, a paper is then allowed recording an image that is generated by duplication of an image of a document placed on a document conveyance apparatus (not shown), in accordance with the procedure as describe above. Papers may be allowed sequentially recording an image that is generated by duplication of image of document placed on a document conveyance apparatus (not shown).

When the image recording job is completed, the recording control unit 30 sends a job completion signal representing that the image recording job is completed, to the image quality adjustment unit 20.

The counters 221, 222 are controlled by the recording control unit 30 to count a number of paper supplied to the second transfer position. When a simple process control described later is carried out, the image quality adjustment unit 20 reset results of the number counted by the counters 221, 222, to be "0". In other words, the counters 221, 222 count a number of papers having recorded images after a simple process control is carried out (hereinafter, referred to a number of recorded paper). It should be noted that the counter 221 counts about color images and the counter 222 counts about monochrome images. In the case of forming an image on both side of a paper, the counters count as if a number of recorded paper is two although actual number of paper is one.

The image quality adjustment unit 20 calculates a total number of recorded paper after shipment from a factory (hereinafter, referred to as accumulative number of recorded paper) by adding results of the number counted by the counters 221, 222 respectively, and then store the accumulative number of recorded paper in the storage 21. It should be noted that the accumulative number of recorded paper stored in the storage 21 may be reset to be "0" when photoconductor drums 101a-101d or the development device 102a-102d are exchanged with new ones.

The reflection density sensors 23a-23d detect optical reflection densities of images formed on the photoconductor drums 101a-101d.

Next, a formal process control and a simple process control are explained. Each process control is carried out to keep a stable quality of image recorded on a paper, in a case of satisfying a predetermined condition.

For example, the formal process control is carried out when the power is turned on for the first time after shipment from the factory. Further, the formal process control is carried out, after one simple process control is carried out, when it is decided that the formal process control should be carried out, in accordance with the result of carrying out the simple process control.

The simple process control is carried out, at the time of completion of an image recording job, when each of the number of recorded papers counted by the counters 221, 222 are no less than a given number stored in the storage 21. In this embodiment, a given number for color images is 50, and a given number for monochrome images is 100. When a number of recorded paper for monochrome images is no less than a given number for monochrome images, the image forming apparatus 100 carries out a simple process control only for the image forming unit pa (monochrome image simple process control). On the other hand, when a number of recorded paper for color images is no less than a given number for color images, the image forming apparatus 100 carries out a simple process control for all the image forming units pa-pd (color image simple process control).

In the formal process control in accordance with this embodiment, the image forming apparatus 100 firstly carries out a high concentration process control, and then carries out a halftone process control. The high concentration process control is for keeping a constant density of filled image recorded on a paper to be a predetermined density. As an image quality adjustment value for the high concentration process control, the image forming apparatus 100 adjusts charge control values of the charge rollers 103a-103d that charge photoconductor drums 101a-101d respectively (See S41-44 shown in FIG. 6 described later). The halftone process control is for keeping a gamma characteristic of halftone to be a predetermined gamma characteristic. As an image quality adjustment value for the halftone process control, the image forming apparatus 100 adjusts an exposure control value of the exposure unit E (See S45-48 in FIG. 6).

On the other hand, in the simple process control in accordance with this embodiment, the image forming apparatus 100 carries out a high concentration process control similar as the high concentration process control carried out in the formal process control (See S31-34 shown in FIG. 4 described later).

It should be noted that the formal process control may omit the high concentration process control and may only perform the halftone process control, when the formal process control is carried out within a predetermined time after a completion of simple process control.

Figure 3:
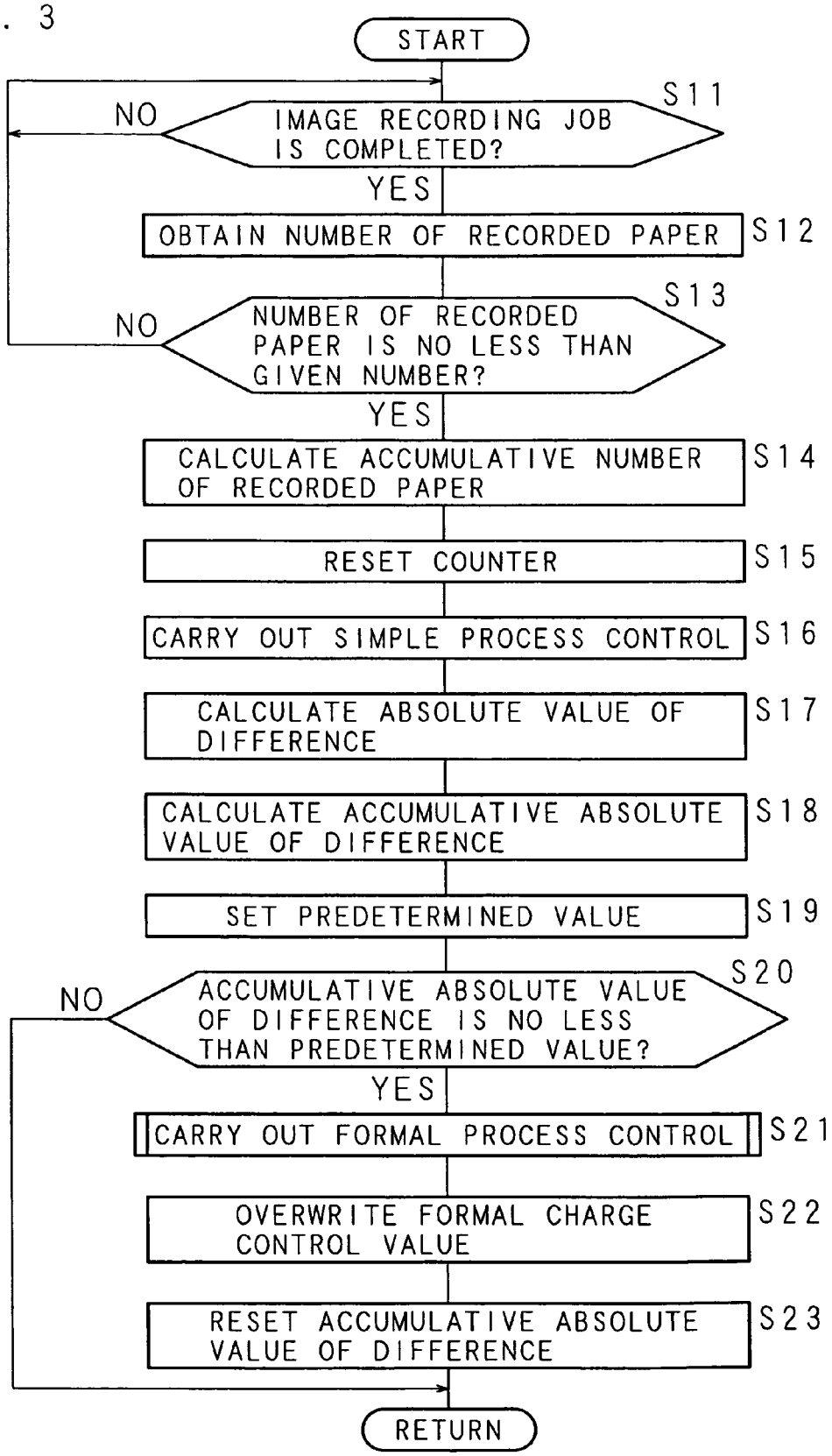
FIG. 3 is a flowchart showing an image forming procedure performed by the image forming apparatus in accordance with the embodiment of the present invention.

FIG. 3 is a flowchart showing an image forming procedure performed by the image forming apparatus 100 in accordance with the embodiment of the present invention.

The image quality adjustment unit 20 determines whether the recording unit 300 completes an image recording job or not, in other words, whether the recording control unit 30 sends a job completion signal or not (S11). The image quality adjustment unit at S11 serves as completion determination means.

In a case that the job completion signal is not sent (S11: NO) means that the present time is in the course of carrying out an image recording job, or that an image recording job is not started after carrying out S13 described later. When the job completion signal is not sent (S11: NO), image quality adjustment unit 20 repeats S11. Thus, the image forming apparatus 100 does not carry out each of image quality adjustments (process controls) during carrying out an image recording job. Furthermore, no process control is wastefully carried out, when no process control is required before starting an image recording job.

When the recording unit 300 completes an image recording job (S11: YES), the image quality adjustment unit 20 obtains each of numbers of recorded paper counted by the counters 221, 222 (S12). Then, the image quality adjustment unit 20 reads out given numbers for color images and for monochrome images, and determines whether the numbers of recorded paper for color images and for monochrome images obtained at S12 are no less than the given numbers for color images and for monochrome images respectively or not (S13). The image quality adjustment unit 20 at S13 serves as sheet number determination means.

When the number of recorded paper for color images is less than the given number for color images and the number of recorded paper for monochrome images is less than the given number for monochrome images (S13: NO), no process control is required to be carried out. Thus, the image quality adjustment unit 20 returns the procedure to S11, with carrying out neither the simple process control nor the formal process control.

When the number of recorded paper for color images is no less than the given number for color images or the number of recorded paper for monochrome images is no less than the given number for monochrome images (S13: YES), the image quality adjustment unit 20 adds a result of the number counted by the counter representing no less than the given number onto the accumulative number of recorded paper stored in the storage 21, to update the accumulative number of recorded paper (S14). In this embodiment, the image forming apparatus 100 is explained to obtain both accumulative numbers of color images and of monochrome images, for illustrative purposes. It should be noted that the image forming apparatus 100 may obtain separately the accumulative numbers of color images and of monochrome images.

After the completion of S14, the image quality adjustment unit 20 resets a result of the number counted by the counter 221 or 222 representing no less than the given number to be "0" (S15), reads out a subroutine of simple process control (See FIG. 4), and then carries out the simple process control (S16). When the number of recorded paper counted by the counter 221 is less than the given number, the image forming apparatus 100 carries out a simple process control only for the image forming unit pa (i.e., monochrome image simple process control). When the image forming apparatus 100 carries out a color image simple process control, both results of the number counted by the counters 221, 222 may be added accumulative numbers of recorded paper stored in the storage 21 at S14, and both results of the number counted by the counter 221, 222 may be reset to be "0".

Hereinafter, a simple control value means a charge control value adjusted by the high concentration process control of the simple process control, a formal charge control value means a charge control value adjusted by the high concentration process control of the formal process control. A charge control value stored in the storage 21 is the latest formal charge control value (See S22 described later).

FIG. 4 is a flowchart showing a subroutine of simple process control procedure performed by the image forming apparatus 100 in accordance with the embodiment of the present invention.

In the following, although the charge roller 103a is explained for illustration purposes, charge control values are similarly adjusted for charge rollers 103b-103d respectively.

The image forming apparatus 100 has a charge roller 103a that is applied −1250V, at the shipping from a factory. In this case, a surface potential of the photoconductor drum 101a will be −650V.

The image quality adjustment unit 20 controls the recording control unit 30 to form 3 filled patch images that are rectangular shapes 30 mm on a side (S31). Each of the 3 filled patch images is a black filled patch image with a different density.

At S31, the recording control unit 30 firstly applies to the charge roller 103a a voltage having a charge control value set in the recording control unit 30 (See S34 and S44 described later), to fill a part of the photoconductor drum 101a with black toners. Thus, a first filled patch image is formed. The recording control unit 30 then applies to the charge roller 103a a voltage having a charge control value that is obtained by applying 500V to the charge control value described above, to fill another part of the photoconductor drum 101a with black toners. The recording control unit 30 finally applies to the charge roller 103a a voltage having a charge control value that is obtained by subtracting 50V from the charge control value described above, to further fill another part of the photoconductor drum 101a with black toners. Thus, a second and third filled patch images are formed.

When forming a filled patch image, the recording control unit 30 does not allow the exposure unit E to expose the photoconductor drum 101a.

The image quality adjustment unit 20 at S31 serves as first forming control means.

Next, the image quality adjustment unit 20 obtains a result detected by the reflection density sensor 23a (S32). In other words, the image quality adjustment unit 20 obtains an optical reflection density of the filled patch image formed on the photoconductor drum 101a (S32). Then, the image quality adjustment unit 20 calculates a charge control value that can give a predetermined optical reflection density, in accordance with the obtained optical reflection density, for example, with using an approximated linear expression (S33). The image quality adjustment unit 20 at S32 serves as first density obtaining means with using the reflection density sensor 23a. Furthermore, the image quality adjustment unit 20 at S33 serves as first calculating means.

The image quality adjustment unit 20 finally sets, to the recording unit 300, the simple charge control value calculated at S33 (e.g. −1280V) as a voltage value applied to the charge roller 103a at the next image forming time (S34). The image quality adjustment unit 20 at S34 serves as first setting means.

For example, the simple charge control value calculated at S33 is stored in a non-volatile memory included in the recording unit 300. Then, the recording control unit 30 controls, with using the simple charge control value stored in the memory, the voltage applied to the charge roller 103a. The charge control value is adjusted as described above.

After the completion of S34, the image quality adjustment unit 20 returns the procedure to the main routine.

As shown in FIG. 3, the image quality adjustment unit 20 reads out a formal charge control value stored in the storage (e.g., −1275V) after the completion of S16, calculates an absolute value of difference between the read charge control value and the simple charge control value obtained by the simple process control at S16 (S17: in this embodiment, 5V), and add the calculated absolute value of a difference to the accumulative absolute value of difference stored in the storage 21 to update the accumulative absolute value of difference (S18). The image quality adjustment unit 20 at S18 serves as accumulation means.

Then, the image quality adjustment unit 20 sets a predetermined value in accordance with the accumulative number of recorded paper stored in the storage 21, with referring a predetermined value table stored in the storage 21 (S19).

FIG. 5 is a schematic view showing an example of predetermined value table stored in the storage 21 of the image forming apparatus 100 in accordance with the embodiment of the present invention.

The predetermined value table stores accumulative numbers of recorded paper (thousand fold) and predetermined values. In the predetermined value table illustrated in FIG. 5, a predetermined value is "40" when the accumulative number of recorded paper is not more than 10,000, a predetermined value is "25" when the accumulative number of recorded paper is not more than 20,000, a predetermined value is "20" when the accumulative number of recorded paper is not more than 30,000, and a predetermined value is "15" when the accumulative number of recorded paper is more than 30,000. In short, the predetermined value is configured to be reduced in accordance with an increase of the accumulative number of recorded paper.

For example, the correspondence between the accumulative number of recorded paper and the predetermined value is determined experimentally, and stored in the predetermined value table in advance.

For example, the accumulative number of recorded paper stored in the storage 21 is 15,000, the image quality adjustment unit 20 sets "25" as the predetermined value at S19 shown in FIG. 3. Similarly, the accumulative number of recorded paper stored in the storage 21 is, for example, 35,000, the image quality adjustment unit 20 sets "15" as the predetermined value.

In this embodiment, the same predetermined value is set at S19, regardless of carrying out the monochrome image simple process control or the color image simple process control at S16. It should be noted that different predetermined values may be set on the basis of carrying out the monochrome image simple process control or the color image simple process control, when the accumulative numbers of color images and of monochrome images are separately obtained as S14.

As shown in FIG. 3, the image quality adjustment unit 20 determines whether the accumulative absolute value of difference stored in the storage 21 is no less than the predetermined value set at S19 or not (S20). When the accumulative absolute value of difference stored in the storage 21 is less than the predetermined value set at S19 (S20: NO), the image quality adjustment unit 20 returns the procedure to S111 instead of carrying out the formal process control, because it is assumed that image quality is stable. The image quality adjustment unit 20 at S20 serves as practice determination means.

When the accumulative absolute value of difference stored in the storage 21 is no less than the predetermined value set at S19 (S20: YES), the image quality adjustment unit 20 reads out a subroutine for the formal process control (See FIG. 6), and then carries out the formal process control (S21).

Figure 6:
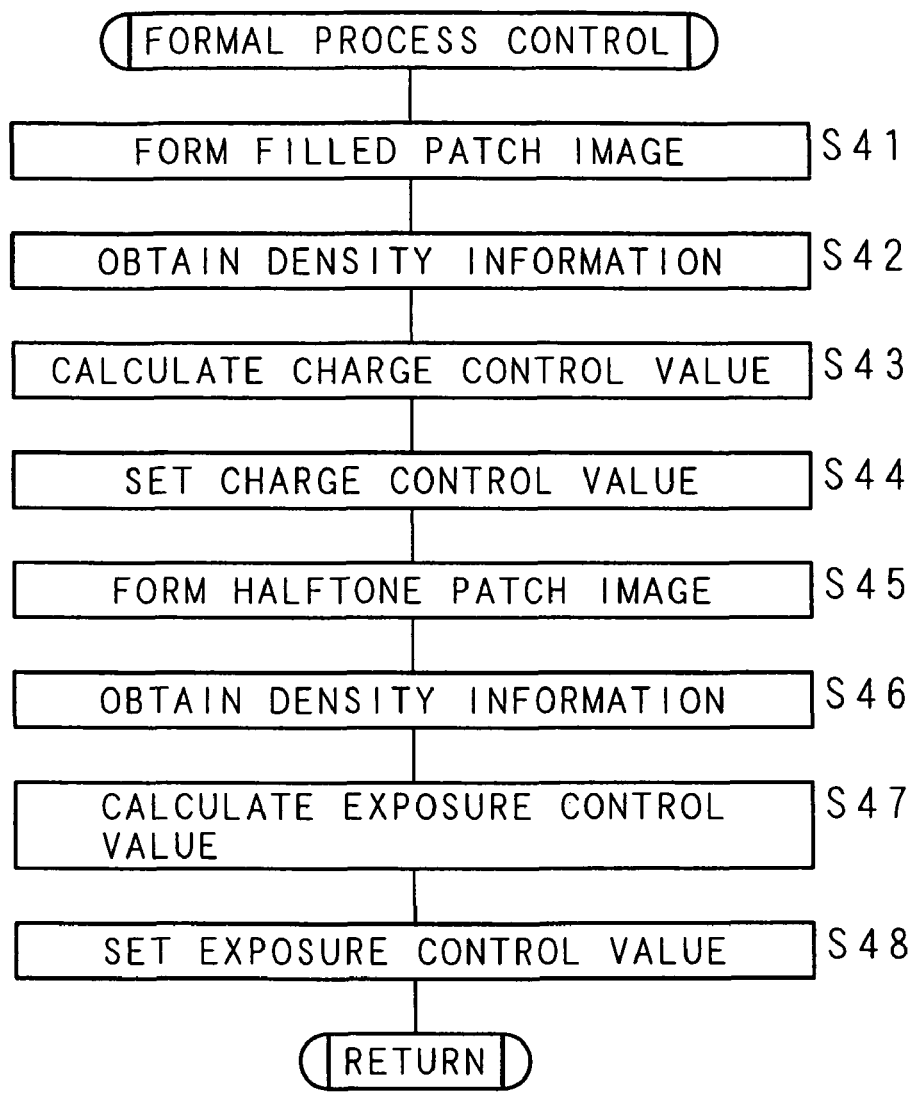
FIG. 6 is a flowchart showing a subroutine of a formal process control procedure performed by the image forming apparatus in accordance with the embodiment of the present invention.

FIG. 6 is a flowchart showing a subroutine of a formal process control procedure performed by the image forming apparatus 100 in accordance with the embodiment of the present invention.

The image quality adjustment unit 20 controls the recording control unit 30 to form filled patch images (S41), obtains an optical reflection density consisting of the result detected by the reflection density sensor 23a (S42), calculates a charge control value that can give a predetermined optical reflection density in accordance with the obtained optical reflection density (S43), and sets to the recording unit 300 the calculated charge control value as a formal charge control value (S44). Such S41-44 are similar as S31-34 of the simple process control. Thus, detailed explanations of S41-44 are omitted.

After the completion of S44, the image quality adjustment unit 20 controls the recording control unit 30 to form halftone patch images (S45).

At S45, the recording control unit 30 applies to the charge roller 103a a voltage having the charge control value set in the recording unit 300. Further, the recording control unit 30 makes the exposure unit E expose the photoconductor drum 101a with modifying the exposure control value. Thus, dozens of halftone patch images are formed on the photoconductor drum 101a.

Next, the image quality adjustment unit 20 obtains a result detected by the reflection density sensor 23a (S46). In other words, the image quality adjustment unit 20 obtains the optical reflection densities of halftone patch images formed on the photoconductor drum 101a (S46). Then, the image quality adjustment unit 20 calculates, in accordance with the obtained optical reflection densities, the exposure control value that can give a predetermined gamma characteristic value (S47).

Finally, the image quality adjustment unit 20 sets the exposure control value calculated at S47 to the recording unit 300 (S48), and returns the procedure to the main routine.

The image quality adjustment unit at S41 and S45 serves as second forming control means. Furthermore, the image quality adjustment unit 20 serves: as second density obtaining means, at S42 and S46, with using the reflection density sensor 23a; second calculating means, at S43 and S47; and as second setting means, at S44 and S48.

As shown in FIG. 3, the image quality adjustment unit 20 overwrites the formal charge control value calculated at S21 for the formal process control onto the formal charge control value stored in the storage 21 (S22).

Finally, the image quality adjustment unit 20 resets the accumulative absolute value of difference stored in the storage 21 to be "0" (S23) and returns the procedure to S11.

Thus, even when the number of recorded paper is no less than the given number, the formal process control is not carried out in the case that the accumulative absolute value of difference is less than the predetermined value. The case that the accumulative absolute value of difference is less than the predetermined value means that image quality is assumed to be stable. The charge control value is adjusted by the simple process control. Thus, carrying out no formal process control does not give negative influences to the image quality.

Moreover, even when the accumulative absolute value of difference is fixed (e.g., "20"), the formal process control is configured to be carried out in the case that the accumulative number of recorded paper is larger (e.g., 35,000) but not in the case that the accumulative number of recorded paper is smaller (e.g., 15,000). The reason is that the image quality will be unstable only with the simple process control, in response to the increase of the accumulative number of recorded paper, in other words, in response to the increase of the number of formed image, because of the deterioration of the photoconductor drums 101a-101d, two component developers and the like. In this embodiment, the formal process control is carried out more often in response to the increase of the accumulative number of recorded paper. Thus, these configurations keep the stability of image quality.

In this embodiment, the formal process control is determined whether to be carried out or not in accordance with the accumulative absolute value of difference based on the simple charge control value and the latest formal charge control value. However, the present invention is not limited to such configurations. For example, the formal process control may be carried out when an absolute value of difference between the simple charge control value and the latest formal charge control value exceeds a predetermined value.

It should be noted that, in the case of deciding whether the formal process control is carried out or not in accordance with the absolute value of difference, no formal process control is carried out with the absolute value of difference being continuously smaller than the predetermined value. On the other hand, in the case of deciding whether the formal process control is carried out or not in accordance with the accumulative absolute value of difference, it is possible to carry out the formal process control at proper timing for keeping up stabilization of image quality, because the accumulative absolute value of difference will excess the predetermined value even with the smaller absolute value of difference.

Furthermore, the decision for carrying out formal process control may be based on an absolute value of difference between the present simple charge control value and the previous simple charge control value.

It is possible to decide whether the formal process control is carried out or not, in accordance with an absolute value of difference between the present simple charge control value and a predetermined charge control value set in the image forming apparatus 100 in advance. Further, it is possible to decide in accordance with an accumulative absolute value of difference of this absolute value of difference described above. It should be noted that the charge control value actually adjusted by the recording unit 300 reflects environmental status, such as temperature and moisture at the installation site of the image forming apparatus 100, while the predetermined charge control value set in the image forming apparatus 100 in advance does not reflect such environmental status. Thus, it is difficult to carry out the formal process control at proper timing, if the decision for carrying out formal process control is depending on the predetermined charge control value set in the image forming apparatus 100 in advance.

The photoconductor drums 101a-101d of the image forming apparatus 100 serve as an image carrier. The development devices 102a-102d, charge rollers 103a-103d and the exposure unit E of the image forming apparatus 100 serve as an image forming unit. The charge rollers 103a-103d further serve as a charge unit.

The intermediate transfer belt 11 and the first transfer rollers 13a-13d serve as a transfer unit. The sheet conveyor unit 301 serves as a conveyor unit. The reflection density sensors 23a-23d serve as a density detecting unit. Furthermore, counters 221, 222 serve as sheet number count means. It should be noted that the image quality adjustment unit 20 counts the number of recorded paper, for example, with using the storage 21. In this case, the image quality adjustment unit 20 increments the number of recorded paper stored in the storage 21 every recording image on a paper.

The image forming apparatus 100, as described above, carries out a simple process control when an image recording job is completed. Thus, no image recording job is interrupted in the course of the image recording job. Furthermore, the simple process control needs shorter required time than the formal process control. Therefore, even if a user requires carrying out an image recording job during carrying out the simple process control, the user does not need waiting for long time until the simple process control is completed.

Moreover, it is possible to carry out the f formal process control in the case that the simple process control is not enough for keeping a stable image quality. Therefore, it is possible to constantly keep a stable image quality.

In other words, it is possible to prevent a shortage of toners caused by carrying out process controls because of carrying out at required timing the formal process control less often than the simple process control, and to prevent deteriorating the photoconductor drums 101a-101d, two component developers and the like, without reducing the frequency of the process control itself.

In this embodiment, the charge control value is utilized as the image quality adjustment value of high concentration process control. However, this invention is not limited to these configurations. A developing bias voltage value applied to the first transfer roller 13a may be utilized as the image quality adjustment value of high concentration process control. Furthermore, the intermediate transfer belt 11 may be utilized as the image carrier to detect optical reflection densities of patch images formed on the intermediate transfer belt 11.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image quality adjustment method for adjusting a quality of an image recorded on a recording sheet by an image forming apparatus having:

an image forming unit that forms an image on an image carrier using image forming materials; a transfer unit, that transfers the image formed on the image carrier by the image forming unit onto a recording sheet; a conveyor unit that conveys the recording sheet having the transferred image; a density detecting unit that detects a density of the image formed on the image carrier; an image quality adjustment unit that adjusts a quality of the image recorded on the recording sheet, an accumulation unit that calculates an accumulated value by accumulating each absolute value of difference between an image quality adjustment value calculated by a second calculating unit at a predetermined time and an image quality adjustment value calculated by a first calculating unit after the second calculating unit has calculated the image quality adjustment value at the predetermined time; and, a practice determination unit that determines weather an additional image quality adjustment should be carried out in accordance with whether the accumulated value calculated by the accumulation unit is no less than a predetermined value or not, the image quality adjustment method comprising:

a completion determination step that determines whether a conveyance of recording sheet by the conveyor unit is completed or not;

a sheet number determination step that determines whether a number of recording sheet having the image transferred by the transfer unit after an image quality adjustment performed by the image quality adjustment unit is no less than a given number or not;

a first image quality adjustment step that makes the image forming unit form a predetermined number of patch images on the image carrier using a predetermined amount of image forming materials; adjusts an image quality adjustment value for adjusting a quality of the image recorded on a recording sheet, in accordance with densities of the formed patch images; and forms an image on the image forming unit using the adjusted image quality adjustment value; when the completion determination step determines that a conveyance of recording sheet by the conveyor unit is completed and the sheet number determination step determines that a number of recording sheet having the image transferred by the transfer unit after an image quality adjustment performed by the image quality adjustment unit is no less than a given number;

a second image quality adjustment step that makes the image forming unit form a larger number of patch images than the predetermined number on the image carrier using a larger amount of image forming materials than the predetermined amount; and adjusts an image quality adjustment value for adjusting quality of image recorded on a recording sheet, in accordance with densities of the patch images formed by the second image quality adjustment step;

an accumulation step that calculates an accumulated value by accumulating each absolute value of difference between an image quality adjustment value calculated by a second calculating unit at a predetermined time and an image quality adjustment value calculated by a first calculating unit after the second calculating unit has calculated the image quality adjustment value at the predetermined time;

a practice determination step that determines whether an additional image quality adjustment should be carried out, in accordance with whether the accumulated value calculated by the accumulation unit is no less than a predetermined value or not, and a forming step that forms an image on the image forming unit using the image quality adjustment value adjusted by the second image quality adjustment step, when the practice determination step determines that an additional image quality adjustment should be carried out.

2. An image forming apparatus comprising:

an image forming unit that forms an image on an image carrier using image forming materials;

a transfer unit that transfers the image formed on the image carrier by the image forming unit onto a recording sheet;

a conveyor unit that conveys the recording sheet having the image transferred by the transfer unit;

a density detecting unit that detects a density of the image formed on the image carrier;

an image quality adjustment unit that adjusts quality of image recorded on the recording sheet;

a completion determination unit that determines whether a conveyance of recording sheet by the conveyor unit is completed or not;

a sheet number count unit that counts a number of recording sheet having the image transferred by the transfer unit after an image quality adjustment performed by the image quality adjustment unit;

a sheet number determination unit that determines whether the number counted by the sheet number count unit is no less than a given number or not;

a first forming control unit that makes the image forming unit form a predetermined number of patch images on the image carrier using a predetermined amount of image forming materials, when the completion determination unit determines that a conveyance of recording sheet by the conveyor unit is completed and the sheet number determination unit determines the number counted by the sheet number count unit is no less than a given number;

a first density obtaining unit that obtains density information of the patch images formed by the first forming control unit from the density detecting unit;

a first calculating unit that calculates an image quality adjustment value for adjusting quality of image recorded on a recording sheet, in accordance with the density information obtained by the first density obtaining unit;

a first setting unit that sets the image quality adjustment value calculated by the first calculating unit onto the image forming unit, for making the image forming unit form an image using the image quality adjustment value calculated by the first calculating unit;

a practice determination unit that determines whether an additional image quality adjustment should be carried out or not, in accordance with the image quality adjustment value calculated by the first calculating unit and a predetermined determination condition;

a second forming control unit that makes the image forming unit form a larger number of patch images than the predetermined number on the image carrier using a larger amount of image forming materials than the predetermined amount, when the practice determination unit determines that an additional image quality adjustment should be carried out;

a second density obtaining unit that obtains density information of the patch images formed by the second forming control unit from the density detecting unit;

a second calculating unit that calculates an image quality adjustment value for adjusting quality of image recorded on a recording sheet, in accordance with the density information obtained by the second density obtaining unit;

a second setting unit that sets the image quality adjustment value calculated by the second calculating unit onto the image forming unit, for making the image forming unit form an image using the image quality adjustment value calculated by the second calculating unit, and an accumulation unit that calculates an accumulated value by accumulating each absolute value of difference between the image quality adjustment value calculated by the second calculating unit at a predetermined time and the image quality adjustment value calculated by the first calculating unit after the second calculating unit has calculated the image quality adjustment value at the predetermined time;

wherein, the practice determination unit determines in accordance with whether the accumulated value calculated by the accumulation unit is no less than a predetermined value or not.

3. The image forming apparatus according to claim 2, wherein
the predetermined value is reduced in accordance with an increase of a number accumulating each number of a recording sheet.

4. The image forming apparatus according to claim 2, wherein
the patch images formed by the first forming control unit are filled patch images that are configured by filling the image forming materials on a part of the image carrier;
the patch images formed by the second forming control unit comprises filled patch images and patch images other than filled patch images;
the second density obtaining unit obtains each density information of the filled patch images and the patch images other than filled patch images formed by the second forming control unit; and
the second calculating unit calculates a first image quality adjustment value in accordance with density information of filled patch images obtained by the second density obtaining unit, and a second image quality adjustment value in accordance with density information of patch images other than filled patch images obtained by the second density obtaining unit.

5. The image forming apparatus according to claim 2, wherein
the image forming unit comprises a charge unit that charges the image carrier; and
the first calculating unit, as well as the second calculating unit, utilizes a voltage value applied to the charge unit as the image quality adjustment value to be calculated.

6. The image forming apparatus according to claim 2, wherein
the predetermined determination condition is modified in accordance with a number accumulating each number of a recording sheet.

7. An image forming apparatus comprising:
an image forming unit that forms an image on an image carrier using image forming materials;
a transfer unit that transfers the image formed on the image carrier by the image forming unit onto a recording sheet;
a conveyor unit that conveys the recording sheet having the image transferred by the transfer unit;
a density detecting unit that detects a density of the image formed on the image carrier;
an image quality adjustment unit that adjusts quality of image recorded on the recording sheet;
a completion determination unit that determines whether a conveyance of recording sheet by the conveyor unit is completed or not;
a sheet number count unit that counts a number of recording sheet having the image transferred by the transfer unit after an image quality adjustment performed by the image quality adjustment unit;
a sheet number determination unit that determines whether the number counted by the sheet number count unit is no less than a given number or not;
a first forming control unit that makes the image forming unit form a predetermined number of patch images on the image carrier using a predetermined amount of image forming materials, when the completion determination unit determines that a conveyance of recording sheet by the conveyor unit is completed and the sheet number determination unit determines the number counted by the sheet number count unit is no less than a given number;
a first density obtaining unit that obtains density information of the patch images formed by the first forming control unit from the density detecting unit;
a first calculating unit that calculates an image quality adjustment value for adjusting quality of image recorded on a recording sheet, in accordance with the density information obtained by the first density obtaining unit;
a first setting unit that sets the image quality adjustment value calculated by the first calculating unit onto the image forming unit, for making the image forming unit form an image using the image quality adjustment value calculated by the first calculating unit;
a practice determination unit that determines whether an additional image quality adjustment should be carried out or not, in accordance with the image quality adjustment value calculated by the first calculating unit and a predetermined determination condition;
a second forming control unit that makes the image forming unit form a larger number of patch images than the predetermined number on the image carrier using a larger amount of image forming materials than the predetermined amount, when the practice determination unit determines that an additional image quality adjustment should be carried out;
a second density obtaining unit that obtains density information of the patch images formed by the second forming control unit from the density detecting unit;
a second calculating unit that calculates an image quality adjustment value for adjusting quality of image recorded on a recording sheet, in accordance with the density information obtained by the second density obtaining unit;
a second setting unit that sets the image quality adjustment value calculated by the second calculating unit onto the image forming unit, for making the image forming unit form an image using the image quality adjustment value calculated by the second calculating unit,
wherein
the patch images formed by the first forming control unit are filled patch images that are configured by filling the image forming materials on a part of the image carrier;
the patch images formed by the second forming control unit comprise filled patch images and patch images other than filled patch images;
the second density obtaining unit obtains each density information of the filled patch images and the patch images other than filled patch images formed by the second forming control unit; and
the second calculating unit calculates a first image quality adjustment value in accordance with density information of filled patch images obtained by the second density obtaining unit, and a second image quality adjustment value in accordance with density information of patch images other than filled patch images obtained by the second density obtaining unit.

8. The image forming apparatus according to claim 7, wherein
the image forming unit comprises a charge unit that charges the image carrier; and
the first calculating unit, as well as the second calculating unit, utilizes a voltage value applied to the charge unit as the image quality adjustment value to be calculated.

9. The image forming apparatus according to claim 7, wherein
the predetermined determination condition is modified in accordance with a number accumulating each number of a recording sheet.

10. The image forming apparatus according to claim 7, wherein
the predetermined value is reduced in accordance with an increase of a number accumulating each number of a recording sheet.

11. An image forming apparatus comprising:
an image forming unit that forms an image on an image carrier using image forming materials;
a transfer unit that transfers the image formed on the image carrier by the image forming unit onto a recording sheet;
a conveyor unit that conveys the recording sheet having the image transferred by the transfer unit;
a density detecting unit that detects a density of the image formed on the image carrier:
an image quality adjustment unit that adjusts quality of image recorded on the recording sheet;
a completion determination unit that determines whether a conveyance of recording sheet by the conveyor unit is completed or not;
a sheet number count unit that counts a number of recording sheet having the image transferred by the transfer unit after an image quality adjustment performed by the image quality adjustment unit;
a sheet number determination unit that determines whether the number counted by the sheet number count unit is no less than a given number or not;
a first forming control unit that makes the image forming unit form a predetermined number of patch images on the image carrier using a predetermined amount of image forming materials, when the completion determination unit determines that a conveyance of recording sheet by the conveyor unit is completed and the sheet number determination unit determines the number counted by the sheet number count unit is no less than a given number;
a first density obtaining unit that obtains density information of the patch images formed by the first forming control unit from the density detecting unit;
a first calculating unit that calculates an image quality adjustment value for adjusting quality of image recorded on a recording sheet, in accordance with the density information obtained by the first density obtaining unit;
a first setting unit that sets the image quality adjustment value calculated by the first calculating unit onto the image forming unit, for making the image forming unit form an image using the image quality adjustment value calculated by the first calculating unit;
a practice determination unit that determines whether an additional image quality adjustment should be carried out or not, in accordance with the image quality adjustment value calculated by the first calculating unit and a predetermined determination condition;
a second forming control unit that makes the image forming unit form a larger number of patch images than the predetermined number on the image carrier using a larger amount of image forming materials than the predetermined amount, when the practice determination unit determines that an additional image quality adjustment should be carried out;
a second density obtaining unit that obtains density information of the patch images formed by the second forming control unit from the density detecting unit;
a second calculating unit that calculates an image quality adjustment value for adjusting quality of image recorded on a recording sheet, in accordance with the density information obtained by the second density obtaining unit;
a second setting unit that sets the image quality adjustment value calculated by the second calculating unit onto the image forming unit, for making the image forming unit form an image using the image quality adjustment value calculated by the second calculating unit, wherein
the predetermined determination condition is modified in accordance with a number accumulating each number of a recording sheet.

12. An image forming apparatus comprising:
an image forming unit that forms an image on an image carrier using image forming materials;
a transfer unit that transfers the image formed on the image carrier by the image forming unit onto a recording sheet;
a conveyor unit that conveys the recording sheet having the image transferred by the transfer unit;
a density detecting unit that detects a density of the image formed on the image carrier;
an image quality adjustment unit that adjusts quality of image recorded on the recording sheet;
a completion determination unit that determines whether a conveyance of recording sheet by the conveyor unit is completed or not;
a sheet number count unit that counts a number of recording sheet having the image transferred by the transfer unit after an image quality adjustment performed by the image quality adjustment unit;
a sheet number determination unit that determines whether the number counted by the sheet number count unit is no less than a given number or not;
a first forming control unit that makes the image forming unit form a predetermined number of patch images on the image carrier using a predetermined amount of image forming materials, when the completion determination unit determines that a conveyance of recording sheet by the conveyor unit is completed and the sheet number determination unit determines the number counted by the sheet number count unit is no less than a given number;
a first density obtaining unit that obtains density information of the patch images formed by the first forming control unit from the density detecting unit;
a first calculating unit that calculates an image quality adjustment value for adjusting quality of image recorded on a recording sheet, in accordance with the density information obtained by the first density obtaining unit;
a first setting unit that sets the image quality adjustment value calculated by the first calculating unit onto the image forming unit, for making the image forming unit form an image using the image quality adjustment value calculated by the first calculating unit;
a practice determination unit that determines whether an additional image quality adjustment should be carried out or not, in accordance with the image quality adjustment value calculated by the first calculating unit and a predetermined determination condition;
a second forming control unit that makes the image forming unit form a larger number of patch images than the predetermined number on the image carrier using a larger amount of image forming materials than the predetermined amount, when the practice determination unit determines that an additional image quality adjustment should be carried out;
a second density obtaining unit that obtains density information of the patch images formed by the second forming control unit from the density detecting unit;
a second calculating unit that calculates an image quality adjustment value for adjusting quality of image recorded on a recording sheet, in accordance with the density information obtained by the second density obtaining unit;
a second setting unit that sets the image quality adjustment value calculated by the second calculating unit onto the image forming unit, for making the image forming unit form an image using the image quality adjustment value calculated by the second calculating unit,
wherein
the predetermined determination condition is modified in accordance with a number accumulating each number of a recording sheet, and
wherein
the image forming unit comprises a charge unit that charges the image carrier; and
the first calculating unit, as well as the second calculating unit, utilizes a voltage value applied to the charge unit as the image quality adjustment value to be calculated.

13. An image forming apparatus comprising:
an image forming unit that forms an image on an image carrier using image forming materials;
a transfer unit that transfers the image formed on the image carrier by the image forming unit onto a recording sheet;
a conveyor unit that conveys the recording sheet having the image transferred by the transfer unit;
a density detecting unit that detects a density of the image formed on the image carrier;
an image quality adjustment unit that adjusts quality of image recorded on the recording sheet;
a completion determination unit that determines whether a conveyance of recording sheet by the conveyor unit is completed or not;
a sheet number count unit that counts a number of recording sheet having the image transferred by the transfer unit after an image quality adjustment performed by the image quality adjustment unit;
a sheet number determination unit that determines whether the number counted by the sheet number count unit is no less than a given number or not;
a first forming control unit that makes the image forming unit form a predetermined number of patch images on the image carrier using a predetermined amount of image forming materials, when the completion determination unit determines that a conveyance of recording sheet by the conveyor unit is completed and the sheet number determination unit determines the number counted by the sheet number count unit is no less than a given number;
a first density obtaining unit that obtains density information of the patch images formed by the first forming control unit from the density detecting unit;
a first calculating unit that calculates an image quality adjustment value for adjusting quality of image recorded on a recording sheet, in accordance with the density information obtained by the first density obtaining unit;
a first setting unit that sets the image quality adjustment value calculated by the first calculating unit onto the image forming unit, for making the image forming unit form an image using the image quality adjustment value calculated by the first calculating unit;
a practice determination unit that determines whether an additional image quality adjustment should be carried out or not, in accordance with the image quality adjustment value calculated by the first calculating unit and a predetermined determination condition;
a second forming control unit that makes the image forming unit form a larger number of patch images than the predetermined number on the image carrier using a larger amount of image forming materials than the predetermined amount, when the practice determination unit determines that an additional image quality adjustment should be carried out;
a second density obtaining unit that obtains density information of the patch images formed by the second forming control unit from the density detecting unit;
a second calculating unit that calculates an image quality adjustment value for adjusting quality of image recorded on a recording sheet, in accordance with the density information obtained by the second density obtaining unit;
a second setting unit that sets the image quality adjustment value calculated by the second calculating unit onto the image forming unit, for making the image forming unit form an image using the image quality adjustment value calculated by the second calculating unit,
wherein
the predetermined value is reduced in accordance with an increase of a number accumulating each number of a recording sheet, and
wherein
the image forming unit comprises a charge unit that charges the image carrier; and
the first calculating unit, as well as the second calculating unit, utilizes a voltage value applied to the charge unit as the image quality adjustment value to be calculated.

14. A nontransitory computer readable medium having stored thereon computer executable program for adjusting quality of image recorded on a recording sheet by an image forming apparatus, the image forming apparatus comprising:
an image forming unit that forms an image on an image carrier using image forming materials; a transfer unit that transfers the image formed on the image carrier by the image forming unit onto a recording sheet; a conveyor unit that conveys the recording sheet having the image transferred by the transfer unit; a density detecting unit that detects a density of the image formed on the image carrier; an image quality adjustment unit that adjusts quality of image recorded on the recording sheet, and, an accumulation unit that calculates an accumulated value by accumulating each absolute value of difference between an image quality adjustment value calculated by a second calculating unit at a predetermined time and an image quality adjustment value calculated by a first calculating unit after the second calculating unit has calculated the image quality adjustment value at the predetermined time; and, a practice determination unit that determines in accordance with whether the accumulated value calculated by the accumulation unit is no less than a predetermined value or not, wherein the computer program when executed causes the image forming apparatus to perform:

an input determination step that determines whether a signal is inputted or not that represents a completion of recording sheet conveyance by the conveyor;

a sheet number determination step that determines whether a number of recording sheet having the image transferred by the transfer unit after an image quality adjustment performed by the image quality adjustment unit is no less than a given number or not;

a first forming control step that makes the image forming unit form a predetermined number of patch images on the image carrier using a predetermined amount of image forming materials, when the input determination step determines that a signal is inputted and the sheet number determination step determines that a number of recording sheet having transferred image by the transfer unit after an image quality adjustment performed by the image quality adjustment unit is no less than a given number;

a first density obtaining step that obtains density information of the patch images formed by the first forming control step from the density detecting unit;

a first calculating step that calculates an image quality adjustment value for adjusting quality of image recorded on a recording sheet, in accordance with the density information obtained by the first density obtaining step;

a first setting step that sets the image quality adjustment value calculated by the first calculating step onto the image forming unit, for making the image forming unit form an image using the image quality adjustment value calculated by the first calculating step;

a practice determination step that determines whether an additional image quality adjustment should be carried out or not, in accordance with the image quality adjustment value calculated by the first calculating step;

a second forming control step that makes the image forming unit form a larger number of patch images than the predetermined number on the image carrier using a larger amount of image forming materials than the predetermined amount, when the practice determination step determines that an additional image quality adjustment should be carried out;

a second density obtaining step that obtains density information of the patch images formed by the second forming control step from the density detecting unit;

a second calculating step that calculates an image quality adjustment value for adjusting quality of image recorded on a recording sheet, in accordance with the density information obtained by the second density obtaining step; and a second setting step that sets the image quality adjustment value calculated by the second calculating step onto the image forming unit, for making the image forming unit form an image using the image quality adjustment value calculated by the second calculating step.

* * * * *